United States Patent Office 3,790,443
Patented Feb. 5, 1974

3,790,443
HYDROXYMETHYLAMINO NITRILE SALTS FOR QUENCHING THE FLUORESCENCE OF OPTICAL BRIGHTENING AGENTS
William M. Reif, 300 Broadway, Dobbs Ferry, N.Y. 10522, and Robert B. Lauder, 94 Brookmere Drive, Fairfield, Conn. 06430
No Drawing. Filed Apr. 27, 1972, Ser. No. 248,202
Int. Cl. D21h 3/52
U.S. Cl. 162—158                                10 Claims

ABSTRACT OF THE DISCLOSURE

A water soluble hydroxymethylamino nitrile salt is applied directly as a dry powder to papermaking materials to quench the fluorescence of optical brightening agents present in the papermaking materials.

---

The present invention is directed to the formation and use of a compound which is employed for quenching or neutralizing the fluorescent effect of optical brightening agents contained in materials utilized for making paper.

As is well known in the paper industry, optical brightening agents are introduced into the substrate for increasing the apparent brightness of the paper. The types of optical brighteners in the art are numerous and well known.

However, it often is desirable to counteract the effect of these optical brightening agents. For example, the degree of brightness may be unduly large or the effect of a brightening agent may be undesirable. An increased fluorescent value may not be necessary and in fact may be against product specifications. Also adjustment of the optical brightener content may be desirable to produce a specific shade in the paper when it is to be colored with a dye or pigment.

The present disclosure is considered to be an improvement in the use of a quenching or neutralizing compound which has been disclosed in U.S. Pat. 3,542,642 patented on Nov. 24, 1970. The compound in this patent may be made by reaction of 1 mole of hydrogen cyanamide with 1 mole of formaldehyde for application in papermaking process. This compound produces a highly efficient quenching result in neutralization of the effect of an optical brightener introduced into the paper substrate. As disclosed in this patent, the reaction product of the hydrogen cyanamide and formaldehyde is water insoluble and must be admixed with glacial acetic acid to produce a clear, active solution of the material. This composition is employed in the treatment of a papermaking composition to counteract the fluorescence and increased brightening effect of the brightener.

However, one important disadvantage of this quencher is that addition of an acid is necessary at the time of use. Also, as a result of this acid addition, the composition exhibits a decreased quenching activity after a relatively short time period.

The present invention is considered to employ the advantages of the quenching material in the salt form, but has the further flexibility and desirability of yielding a highly stable water soluble powder. The product of this disclosure does possess extended shelf stability in its dry state.

THE INVENTION

The present invention is directed to the production and use of a quenching compound for neutralization of the effect of optical brightener materials used to obtain an increased fluorescence in the production of paper.

The present invention is considered to be an improvement over the use of an optical brightener quenching material disclosed in U.S. Pat. 3,542,642. As set forth in this patent a compound is produced by known methods of manufacture, such as the reaction of 1 mole of hydrogen cyanamide with 1 mole of formaldehyde. Also see for example U.S. Pat. 2,019,490 and 2,411,396. The present disclosure utilizes the reaction compound, hydroxymethylamino nitrile, which compound has been misnamed in U.S. Pat. 3,542,642.

The reaction between 1 mole of hydrogen cyanamide with 1 mole of formaldehyde may be written as follows:

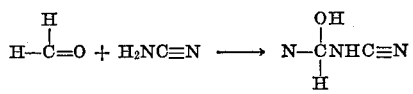

However, the reaction is considerably more complex with numerous complicated cyanamides formed. These reaction products need not be separated from the hydroxymethylamino nitrile for application to quench the optical brightener. As a practical matter the hydroxymethylamino nitrile together with the reaction product are employed in formation of the quenching solution. Separation and isolation of the hydroxymethylamino nitrile is considered to be impractical due to cost consideration. Therefore, in the present disclosure, it is considered the quenching solution will be formed from initial use of hydroxymethylamino nitrile as well as reaction products of hydrogen cyanamide and formaldehyde.

As previously discussed, the effect of optical brightener materials present in papermaking is desired to be neutralized in many instances. The term "optical brightener" is well known in the art and in the papermaking industry. In similar fashion in this application, this term denotes a chemical compound which when added to fiber or other materials comprising the paper or used in its manufacture increases the apparent brightness of the paper over the normal brightness without the optical brightener present thereon.

Papermaking and papermaking materials in this disclosure are used in their broad definition and refer to pulp, clay coatings, starch solutions and the like employed in the manufacture of paper.

The compound of this disclosure, hydroxymethylamino nitrile, is employed in the form of its salt in aqueous solution to produce the quenching effect. The application of this salt is advantageous to at least decrease the effect introduced by the use of the optical brightener.

However, one serious disadvantage of the use of the salt formed by reaction of an acid with hydroxymethylamino nitrile is that this salt in solution is considered to be relatively unstable in maintaining its activity to neutralize the optical brightener. It is considered the quenching solution should be used within about one to two days. Initially the quenching composition does maintain a level of activity in neutralization of the optical brightener compound but a pronounced decrease in activity is experienced in a relatively short time period.

In contrast in the present disclosure, a salt of hydroxymethylamino nitrile, is produced by known reaction conditions of the hydroxymethylamino nitrile with an acid with the additional procedure of drying to remove water and excess acid. As a result, the salt may be stored for long time periods without undergoing loss of product activity. Introduction of this salt into a water medium for prolonged time periods will result in a loss of activity. However, the advantage of the present disclosure is the introduction of the salt to the papermaking processes need not be made until the actual time the quencher is to be employed. Thus the active quencher may be stored for prolonged time periods in a dry state.

The hydroxymethylamino nitrile salt is water-soluble in direct contrast to the hydroxymethylamino nitrile itself. It is, therefore, possible and highly desirable, to add this quenching agent directly to aqueous slurries of papermaking materials without predissolving the quencher in acid or water, and yet obtain optimum results.

In the process of forming the disclosed salt, the hydroxymethylamino nitrile may be made by known methods in the art such as by reaction of 1 mole of hydrogen cyanamide with 1 mole of formaldehyde followed by reaction with acid to yield the salt. The types of acids that may be employed in formation of a salt are varied and may include both organic and inorganic acids. Desirable organic acids include those containing one to eight carbon atoms, both branched and straight chained. Included in such classes of acids are formic, acetic, propionic, octanoic, citric, etc. Inorganic acids which are highly useful are hydrochloric, sulfuric, nitric and phosphoric. Since there are numerous acids which will form the salt when present with hydroxymethylamino nitrile, criticality is not seen present in the use of specific classes of acids. However, one acid has been unexpectedly discovered to give superior results when measured by the activity of the salt in quenching optical brightener compounds. The preferred acid for obtaining the most beneficial and desirable effects has been found to be acetic acid.

The salt is formed in an aqueous environment by use of acid together with the hydroxymethylamino nitrile and as a practical matter other reaction products of the formaldehyde and hydrogen cyanamide. Insufficient acid will denote that product solubility will be at low levels. In such event a greater amount of quencher will be required to produce an equivalent effect. Excess acid may be used but no increase of activity will be realized. Based upon 100 parts of the insoluble quenching composition containing hydroxymethylamino nitrile, between 5 to 100 parts of acid will be used. For example in the case of acetic acid, generally between 6 to 60 parts of acid will be employed with about 25 parts considered to be optimum.

After formation, the salt in its aqueous medium with generally excess acid is considered unstable after standing for a duration of approximately one to two days. This unstability is evidenced through a significant decrease in the ability of the quencher to neutralize a given amount of an optical brightener compound.

To bypass the problems of the hydroxymethylamino salt in solution it has been discovered that the salt in a dry form has excellent stability. Therefore, in the present disclosure excess water and acid is removed by heating. In the technique disclosed herein, a dry powder is formed by drying the solution at a temperature below 100° C. More preferably a temperature no higher than 75° C. will be utilized in formation of the powder. An excess drying temperature will denote that product degradation has taken place with a resulting loss of the quenching effect of the compound in usage. Shorter drying times and low drying temperatures can be realized with concurrent use of vacuum conditions. Thus it is contemplated within the scope of this invention that alternate drying conditions be used so long as a temperature of 75 to 100° C. is not exceeded.

The dry powder has excellent shelf stability and does not possess the loss of quenching effect encountered in storage as compared to storage in an aqueous media. As previously mentioned, it is contemplated and within the scope of this disclosure that additional reaction products of the hydrogen cyanamide and formaldehyde be present in formation of the dry salt. When the dry powder is to be employed in its direct application in a paper coating, slurry or size press coating, it may be merely dissolved in water or added directly to a slurry (pulp, coating or otherwise) to neutralize the increased fluorescent effect due to the optical brightener present.

The water soluble material is generally employed from ½ to about 6 parts by weight for each part of optical brightener present in the substrate material. At the ratio of about 6 parts of the acidified quench to about 1 part of the optical brightener it is considered that about 90–95% neutralization is insured in essentially all cases.

Based upon the amount of hydroxymethylamino nitrile alone, it is considered about ¼ to 5 parts by weight will be employed for each part of optical brightener present. However, the concentration of quenching agent will be dependent upon the type and concentration of the optical brightener compound employed as well as the degree of quenching desired.

Although large excess amounts of hydroxymethylamino nitrile salt over that needed for a quenching effect may be tolerated, generally large excess quantities will be avoided since a slight yellowing of the paper substrate may take place.

As previously disclosed the term optical brightener or optical brightener agent is definite to one in the art and may illustratively include bis-triazinylaminostilbene compounds, coumarin derivatives, monoaminostilbenemonosulfonic acid triazole derivatives, pyrazole derivatives and the like. Further reference to typical examples of these optical compounds may be found in U.S. Pat. 3,542,642.

To further illustrate the innovative aspects of the present invention, the following examples are provided:

EXAMPLE 1

A solution containing 22 parts by weight of hydrogen cyanamide and 17 parts by weight of formaldehyde at pH of 7.5 is mixed continuously with the temperature maintained within the range of 25–30° C. during reaction. After a time period of 1 hour, the reaction is essentially completed and the reaction product, an insoluble precipitate, is isolated by decantation of the solvent.

After filtration, 100 parts of the insoluble product (dry basis) is acidified with 24 parts of glacial acetic acid.

EXAMPLE 2

(a) A 1% dispersion of softwood bleached sulfite pulp was prepared with 100 parts by weight of the pulp employed. With continuous mixing and in a stepwise fashion, the addition of the following components took place:

(1) 1.5 parts by weight of rosin
(2) 0.30 part by weight of alum
(3) 0.25 part by weight of Tinopal PT (a commercially available optical brightener).

To this mixture 0.3 part by weight (active solids basis) of the acidified product from Example 1 was added without storage.

The quenching activity of the employed material was determined in accordance with the following procedure:

(1) using a fluorimeter, determine the fluorescene of the untreated paper (A), the paper containing the optical brightener (B), and the paper containing the optical brightener and quencher (C).
(2) with the above values and the following formula, the percent quench of the optical brightener in the paper is calculated:

$$\text{Percent quench} = \frac{B-C}{B-A} \times 100$$

(b) In similar fashion, part (a) was duplicated except the acidified product of Example 1 was stored for 1, 3, 6, 10 and 17 days prior to addition.

The following table summarizes the results obtained and shows the quenching activity drops in relationship to the storage time with the loss of quenching activity leveling after about 10 days:

| Day: | Percent quench |
|---|---|
| 0 | 77.0 |
| 1 | 76.1 |
| 2 | 73.9 |
| 3 | 72.7 |
| 6 | 65.9 |
| 10 | 61.4 |
| 17 | 61.1 |

EXAMPLE 3

A portion of the product of Example 1 is dried at a temperature of 65° C. for a time period of 3-5 hours under a vacuum of 25 mm. to form a dry powder.

This powder was stored for a time period of 1, 2 and 22 days. The powder is dissolved in water and the Example 2 is repeated in determining the quenching activity.

In each case a quenching activity of 77-78% is obtained.

What is claimed is:

1. A method for quenching the fluorescent effect of an optical brightening agent present with papermaking materials which comprises:
    (a) forming a water soluble salt of hydroxymethylamino nitrile by reaction with acid in the presence of water;
    (b) removing water present with said salt with formation of a dry powder;
    (c) storing said salt in a dry powder form;
    (d) dry powder form of said salt directly to papermaking materials containing an optical brightener to reduce the fluorescent effect produced by the presence of said optical brightener.

2. The method of claim 1 wherein excess acid is employed in step (a), and in step (b) water and excess acid are removed by drying at a temperature below 75° C.

3. The method of claim 1 wherein in step (a) said acid is acetic acid.

4. The method of claim 1 wherein in step (d), said salt is applied at a concentration of ¼ part to about 5 parts by weight, for each part of optical brightener present in said materials.

5. A method for quenching the fluorescent effect of an optical brightening agent present with papermaking materials which comprises:
    (a) reacting hydrogen cyanamide with formaldehyde to form a composition containing hydroxymethylamino nitrile;
    (b) forming a water soluble salt of hydroxymethylamino nitrile by reaction of the composition of step (a) with an excess amount of acid;
    (c) removing the water and excess acid present in the reacted composition of step (b) with formation of a dry powder;
    (d) storing said powder;
    (e) applying the powder of step (d) to papermaking materials containing an optical brightener to reduce the fluorescent effect produced by the presence of said optical brightener.

6. The method of claim 5 wherein in step (c) the water and excess acid are removed by drying at a temperature below 75° C.

7. The method of claim 1 wherein in step (b), said acid is acetic acid.

8. The method of claim 5 wherein in step (e) said powder is applied at a concentration of ½ to about 6 parts by weight for each part of optical brightener present in said materials.

9. In a method for quenching the fluorescent effect of optical brightener compounds present in paper pulp wherein the acid addition salt of hydroxymethylamino nitrile is added to an aqueous paper pulp slurry, said salt being added as an aqueous solution that loses activity with time, the improvement therein which comprises adding said salt in its dry, finely divided form directly to the paper pulp slurry without intermediate solvation thereof.

10. An improvement according to claim 9 in which the acid addition salt of hydroxymethylamino nitrile is the acetic acid salt of hydroxymethylamino nitrile.

References Cited

UNITED STATES PATENTS

| | | | |
|---|---|---|---|
| 3,542,642 | 11/1970 | Speese et al. | 162—162 |
| 3,639,642 | 2/1972 | Matter et al. | 162—162 |

ARTHUR W. KELLOGG, Primary Examiner

P. CHIN, Assistant Examiner

U.S. Cl. X.R.

117—33.5; 162—162

UNITED STATES PATENT OFFICE
CERTIFICATE OF CORRECTION

Patent No. 3,790,443    Dated February 5, 1974

Inventor(s) WILLIAM M. REIF ET AL

It is certified that error appears in the above-identified patent and that said Letters Patent are hereby corrected as shown below:

Column 5, claim 1, line 20, after "(d)", insert-- applying said --.

Signed and sealed this 3rd day of December 1974.

(SEAL)
Attest:

McCOY M. GIBSON JR.
Attesting Officer

C. MARSHALL DANN
Commissioner of Patents